(12) United States Patent
DeCorte et al.

(10) Patent No.: US 10,999,701 B2
(45) Date of Patent: May 4, 2021

(54) SYSTEM FOR ANALYZING AND IMPROVING DEVICE LOCATION AS A FUNCTION OF TIME

(71) Applicant: GRAVY ANALYTICS, INC., Leesburg, VA (US)

(72) Inventors: Guy DeCorte, Bend, OR (US); Jeffrey White, Purcellville, VA (US)

(73) Assignee: GRAVY ANALYTICS, INC., Leesburg, VA (US)

( * ) Notice: Subject to any disclaimer, the term of this patent is extended or adjusted under 35 U.S.C. 154(b) by 0 days.

(21) Appl. No.: 16/214,989

(22) Filed: Dec. 10, 2018

(65) Prior Publication Data

US 2019/0114596 A1 Apr. 18, 2019

Related U.S. Application Data

(63) Continuation of application No. 15/008,980, filed on Jan. 28, 2016, now abandoned, which is a continuation-in-part of application No. 14/001,020, filed as application No. PCT/US2012/040471 on Jun. 1, 2012, now abandoned.

(60) Provisional application No. 62/109,138, filed on Jan. 29, 2015, provisional application No. 61/634,590, filed on Mar. 2, 2012, provisional application No. 61/634,457, filed on Feb. 29, 2012, provisional application No. 61/519,896, filed on Jun. 1, 2011.

(51) Int. Cl.
*H04W 4/02* (2018.01)
*H04W 4/029* (2018.01)
*G06Q 10/10* (2012.01)

(52) U.S. Cl.
CPC ........ *H04W 4/029* (2018.02); *G06Q 10/1095* (2013.01)

(58) Field of Classification Search
CPC .................................................. H04W 4/029
See application file for complete search history.

(56) References Cited

U.S. PATENT DOCUMENTS

| | | | | |
|---|---|---|---|---|
| 7,610,365 | B1 * | 10/2009 | Kraft | G06Q 10/025 709/223 |
| 8,380,804 | B2 * | 2/2013 | Jain | G06Q 10/109 709/207 |
| 8,655,960 | B2 | 2/2014 | Lewis | |
| 2005/0273493 | A1 | 12/2005 | Buford | |
| 2006/0270421 | A1 * | 11/2006 | Phillips | G08B 21/0236 455/457 |
| 2007/0149214 | A1 * | 6/2007 | Walsh | H04L 12/1859 455/456.1 |
| 2007/0264968 | A1 | 11/2007 | Frank et al. | |

(Continued)

OTHER PUBLICATIONS

International Search Report issued in PCT/US2012/040471 dated Dec. 14, 2012.

(Continued)

*Primary Examiner* — Kurtis Gills
(74) *Attorney, Agent, or Firm* — DLA Piper LLP US (57) ABSTRACT

A system for use with a system for providing predictive discovery data services to a user comprising processor means providing enhanced data reflecting one or more of: refined proximity boundaries around areas of user interest; analysis of time of a user device location relative to proximity boundaries; assessment of location of user attendance in and allowing selected user access to the enhanced data.

28 Claims, 7 Drawing Sheets

(56) References Cited

U.S. PATENT DOCUMENTS

| | | | |
|---|---|---|---|
| 2008/0032719 A1* | 2/2008 | Rosenberg | G06Q 30/02 |
| | | | 455/466 |
| 2008/0195312 A1* | 8/2008 | Aaron | G06Q 30/0201 |
| | | | 455/418 |
| 2008/0281687 A1 | 11/2008 | Hurwitz et al. | |
| 2010/0125478 A1* | 5/2010 | Bisht | G06Q 10/109 |
| | | | 705/7.19 |
| 2010/0153008 A1 | 6/2010 | Schwartz et al. | |
| 2011/0018709 A1 | 1/2011 | Kornbluh | |
| 2011/0060808 A1* | 3/2011 | Martin | G06F 16/9537 |
| | | | 709/217 |
| 2014/0364149 A1* | 12/2014 | Marti | G01C 21/34 |
| | | | 455/456.3 |

OTHER PUBLICATIONS

Written Opinion issued in PCT/US2012/040471 dated Dec. 14, 2012.
U.S. Appl. No. 15/008,980.
U.S. Appl. No. 15/060,887.
U.S. Appl. No. 14/001,020.

\* cited by examiner

SYSTEM FOR ANALYZING AND IMPROVING DEVICE LOCATION AS A FUNCTION OF TIME

INTRODUCTION

A significant problem with determining attendance by penetration of a geofence by a mobile device carried by a user is the accuracy with which mobile devices report their location. A geofence is the physical boundary around a map location containing items of interest such as events, stores, friends, etc. Devices with GPS turned off and/or GPS unavailable (indoors or non line of site with GPS satellites) or using less accurate location services report location with insufficient accuracy to know for certain based on a single location whether the device actually tripped the geofence. With very low accuracy, the device's location can be reported up to 500+ meters from where it actually is. While this may be fine for certain applications, such as finding restaurants within 5 miles of the device's current location, it is insufficient for accurately determining attendance.

Because of inaccurate location reporting, a device at a specific place may never trip its geofence, because the device's location is reported hundreds of meter's away from where it currently is. This is an example of a false negative. Because of false negatives, there is a tendency to create geofences larger than the venue's dimensions, in order to increase the probability of a device's reported location tripping the geofence. However, the larger geofences increase the need to determine false positives.

Conversely, a device may appear to trip a geofence, when it did not, because the location was reported within the geofence when the device was actually outside of the geofence. The following diagrams illustrate the basic issues which cause false negatives and false positives.

A device may trip a geofence many times in the space of a few hours making it difficult to determine whether the device has attended the place once, many times or not all, depending on accuracy of the location. The following diagram illustrates this situation.

Other situations may at times lead to the device being reported at multiple places at the same time. The following diagram illustrates this scenario.

BRIEF SUMMARY

A system for improving data accuracy in a system and method for providing predictive discovery services to users which can be either an attender or a provider of events or services wherein a user's mobile, hand-held device has a display for displaying data and a memory for storing information; a memory, which is remote from the hand-held device, for a database (s) for storing user interest data; and a processing device that is in data communication with the database (s). The system of the invention includes developing accurate event or service map location data from on site measurement and or device developed data refined over time by repeated correction based on actual experience. This date provides for the generation of geofences that define a perimeter for the event or service that can be shown as tripped by a customer penetration thereof. The system develops Apps for customer that access predictive discovery data enhanced by the invention and improve the geofence tripping accuracy of benefit to attendees and providers.

DETAILED DESCRIPTION

The system of the invention transforms data on proximity areas, device locations, metadata and data connectedness into a rich and more accurate picture of attendance at events, venues, services and geographical areas. When generating attendance data, the system determines the probability of attendance, scores the attendance based on the probability, detects false positives and merges data from several sources to create rich data about the attendance.

Figure 1:
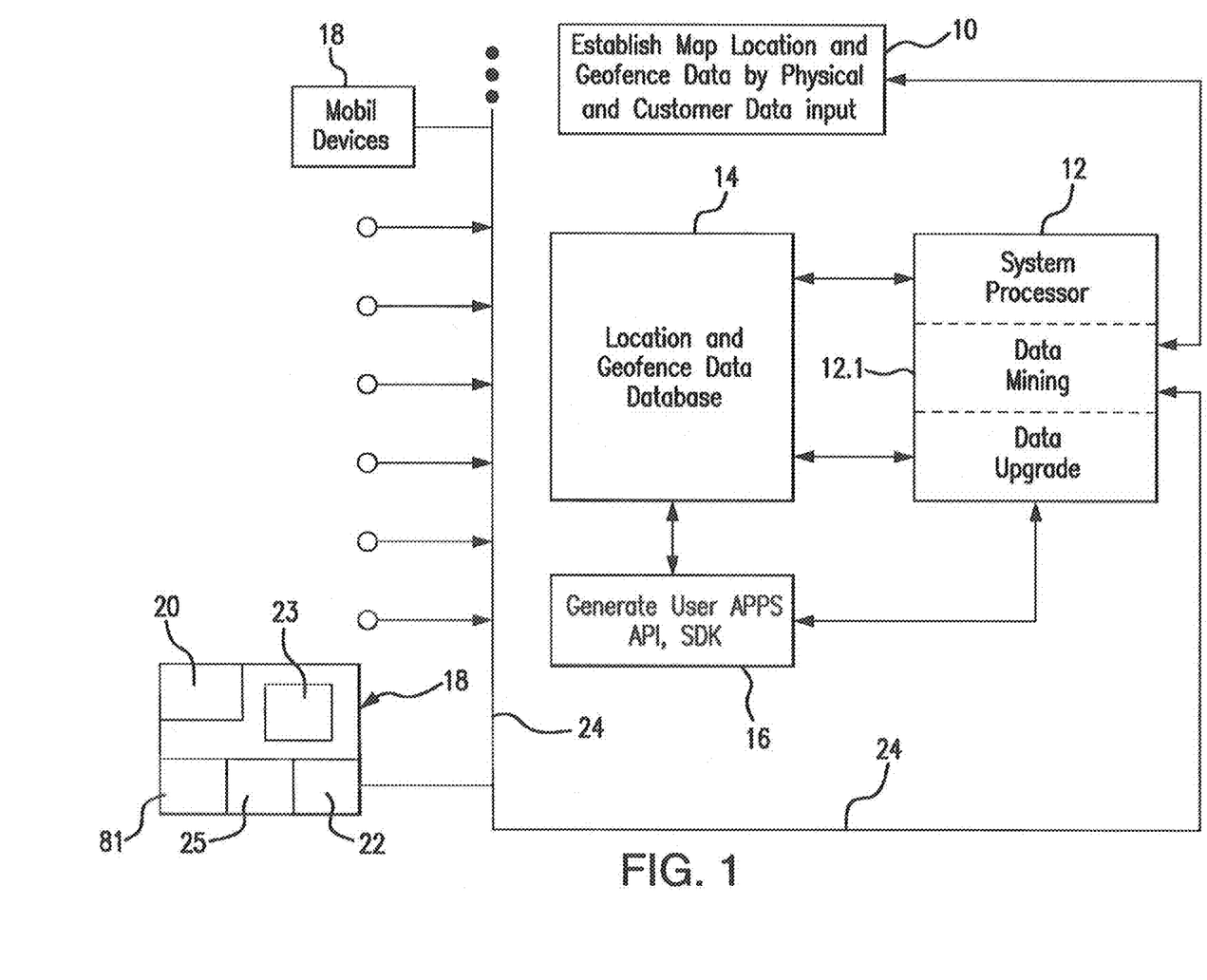
FIG. 1 Shows the general process for using device Apps with enhanced data for more accurate assessment of device location and attendance.

The system, as shown in process 10 of FIG. 1, at a minimum needs only raw device location data and proximity area definitions from initial device information scans or on site acquisitions in order to provide results to a processor 12 for analysis in processor function 12.1. The processor 12 may scan certain sets of data multiple times in function 12.2, using data from the first scans to look for further evidence of attendance or special cases of attendance. The additional scans generally occur because the attendance is borderline indicated as a false positive or special case of attendance such as attendance by employees at places. The data thus developed by the system of the invention is stored in database 14. This data is generated in processor 16 for access by user devices 18 in Apps 20 stored in memory hardware 20. The device 18 Apps are updated and information from the received via communication hardware 22 therein through communication networks 24, wireless, cell or otherwise. Throughout the process the device alerts the user through display 23 of info in memory 20 and signals from OPS and remote sources over network 24.

When considering location data the underlying descriptive discovery processes as enhanced by the invention considers a triplet (device ID, location (latitude, longitude) and time) of information referred to in short hand by DLT, or D(device ID), L(X, Y, Z coordinates) and T(time data sent). The DLT is stored in database 14 and provides the data required to create time contiguous sets of reported device locations within proximity areas. GPS or other positioning mechanism and Apps 21 in devices 18 provide the location information for device location as a function of time.

Figure 2:
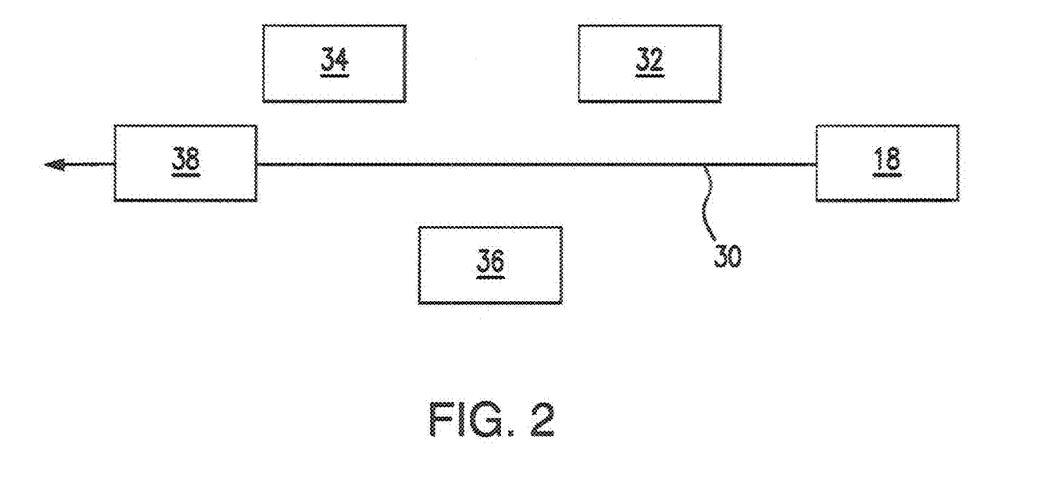
FIG. 2 Shows how location boundaries are assigned.

A user mobile device 18 as shown in FIG. 2 will typical journey over time, possibly with stops, along a path 30 past a series of geofences 32-38 and more typically containing locations of interest where events, stores, friends meetings, etc. occur. The device may pass through a geofence such as 38 in reality but the DTL data may show the device there or nor there or in one or more of the other geofences due to inaccuracies of the information received centrally by processor 12.

The system of the invention in processor 12 first determines whether a location reported is within one or more specific areas, such as defined by boundaries of geofences. It then links all location data reported by a device that are reported within the proximity area by contiguous time order—creating a set of time and proximity area connected data points. It detects possible exits from the specific area(s) by determining the first location reported after the device is detected within the area which is outside of the area and by other heuristic techniques when necessary.

The system then transforms the set of time contiguous reported locations within a specific area into a possible user attendance. During this processing the system calculates the dwell time of the attendance, counts the number of reported specific area locations, counts the number of locations reported with high accuracy and merges the attendance data with other useful metadata including the category of the associated object and address if available.

The system will use two additional sets of data to improve results. The first set of data is enhanced data on device locations, including the accuracy of the location data reported from the device, whether or not the device is moving, whether or not a high accuracy location is reported within a set of locations reported for the same device within a given period of time. The second set of data is metadata relevant to attendance generally at the object type or object level.

Figure 3:
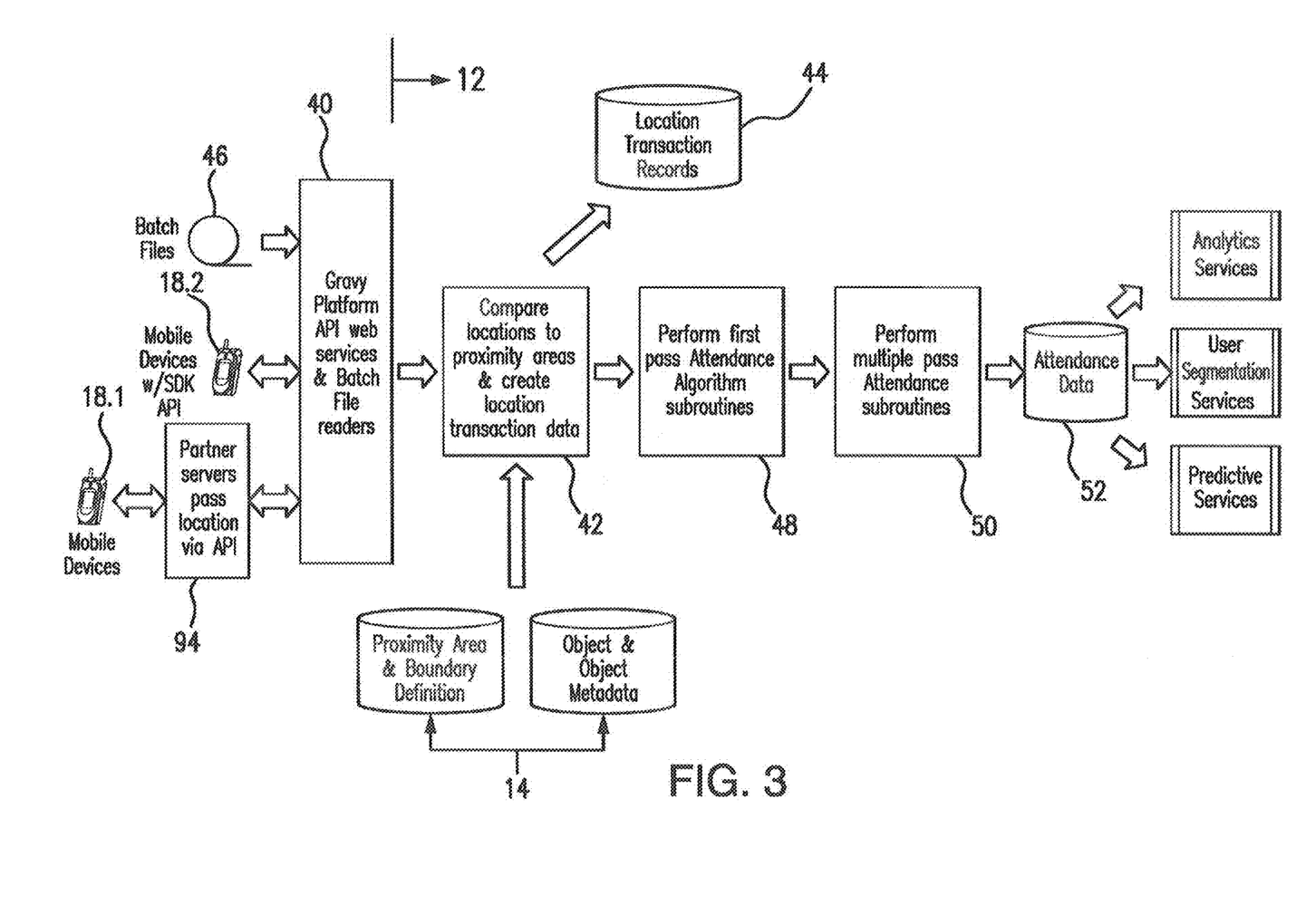
FIG. 3 shows the general device structure in the attendance environment and processing functions for enhanced attendance accuracy.

In greater detail the system of the invention, described as the attendance algorithm throughout, operating within the structure of the prior application, the platform, (TMRZR001XX) of which this is a CIP, is shown in FIG. 3 wherein data used by the location system is received through device location data is received through central system readers 40, through the Platform API, the Platform mobile SDK or as batch files of device location data. The SDK itself is supported by the Platform API but batch files are input through the batch file readers. The Platform authenticates API requests and validates the data received through the API and batch files. Other operations are performed as needed in order to assist with efficient processing. For example, data from multiple batch location files are scanned in order to group together locations from a device in a given time period that otherwise are scattered across multiple files.

The SDK embedded in a customer's mobile application installed upon user subscription to the platform services initially processes the device location data. The location data for the device may be retrieved by the SDK from the platform's locations services, from third party location services or the device location data may be passed from the mobile device and applications to the SDK.

The SDK operates in two modes—SDK Single Location and SDK Batch. The following paragraphs describe the differences between these two modes.

In the SDK Single location mode, locations are passed on to the central system indicating changes in the device state indicating changes in the device at a standstill to the device moving at a walk or faster speeds in one case or from the device moving at faster speeds to a walk or stand still in a second case of change or from a walk to faster speeds or a standstill in a third case of change. Speeds faster than a walk include scenarios where the device is on a moving car, bus or train or possibly even in a plane, reflecting a further state change.

The SDK uses multiple techniques to detect state changes as one way the invention enhances accuracy in its discovery operations. It may use sensors, such as GPS or other sensors 25 on the device 18 and services provided by the platform system 12 to detect movement and modes of travel. Alternatively, it detects motion by computing the device's average speed based on distance traveled over a time duration where speed is the magnitude of the velocity, where velocity is commonly represented by: $v=d/t$, where v is the velocity, d is the distance traveled and t is the time over which the change in distance was measured. Using speed or velocity to detect movement and state change is relevant because in certain cases and on certain devices, sensors are not reliable in terms of detecting movement. The attendance algorithm also applies the speed based check as a further safeguard for detecting fast movement scenarios.

On the state changes, the locations prior and subsequent to the state change are persisted locally by the SDK based processing in the device and also sent to the platform 12 via transmission facilities and the reader 40 Of the platform 12. The SDK may also record and send locations at other times, for example, it is designed to send location data once the device has moved a predetermined number of meters set into the SDK by the user or platform even if the device is moving at the pace of a walk and may send locations occasionally while the device remains at a standstill whether directed to by the algorithms within the SDK or by request from the Platform.

In the case where locations are submitted just prior to and after state changes it reduces the number of locations to be processed by the platform 12 function 42 to the most relevant locations and also reduces the effect of seeing the device within multiple attendances areas while traveling in a car, bus, train or other forms of travel faster than a walk. Devices 18 traveling at high speeds are unlikely to be attending an event or venue and the platform processing responds to that fact in processing location information. These calculations use the data of geofences and location metadata in memory 10.

The SDK Batch mode also records locations based on state changes in memory 44. The SDK Batch mode stores the locations received along with the timestamp of the time the location was determined and time zone the device is currently in for several days. The SDK Batch sends the locations and associated data as a batch referred to the location log. The data is sent to the platform at a system parameter controlled interval. A typical value for this system parameter is 24 hours, i.e. send the device location log to the server every 24 hours. Another system parameter controls how much data to send in the location log. A typical value for this system parameter is 48 hours, i.e. send the last 48 hours of device location data to the platform. Though the second parameter often overlaps the first parameter as in the example able which will cause duplicate locations to be sent to the server, the platform implements an index in memory 14 to ensure each device location is processed only once even if the {device, location, timestamp} triplet is sent to the platform multiple times.

In batch location file functions using files in memory 46, the processing intelligence provided by the SDK is not available. In this case additional processing is performed in functions 42 on the server 12 side in order to make up for this. This includes sorting and ordering the batch locations by device and timestamp to create and store in memory 44 device location logs, as well as filtering out duplicates and locations where speed over time would make it improbable that the device was at an event or place.

Additional processing occurring in functions 48 and 50 of the platform 12 are part of the attendance accuracy function. The attendance algorithm for batch locations calculates initial candidate attendances via an additional step, illustrated in FIG. 4, relevant to this mode of receiving device locations. This is performed because Batch locations may not be collected continuously. For example, the application on the device may only have requested a location right before an ad is sent to the application. This may only occur a few times a day, separated by several hours and the device may have moved miles between each location being received. A candidate device attendance generally must meet the criteria of n1 locations received within n2 meters of each other and within n3 minutes of each other. Then n1, n2 and n3 are parameters that are adjusted to meet the characteristics of the batch location data. Default values for n1, n2 and n3 will change over time, but an n1 value of 2 locations, an n2 value of 50 meters and an n3 value of 60 minutes have worked well in production scenarios.

Figure 4:
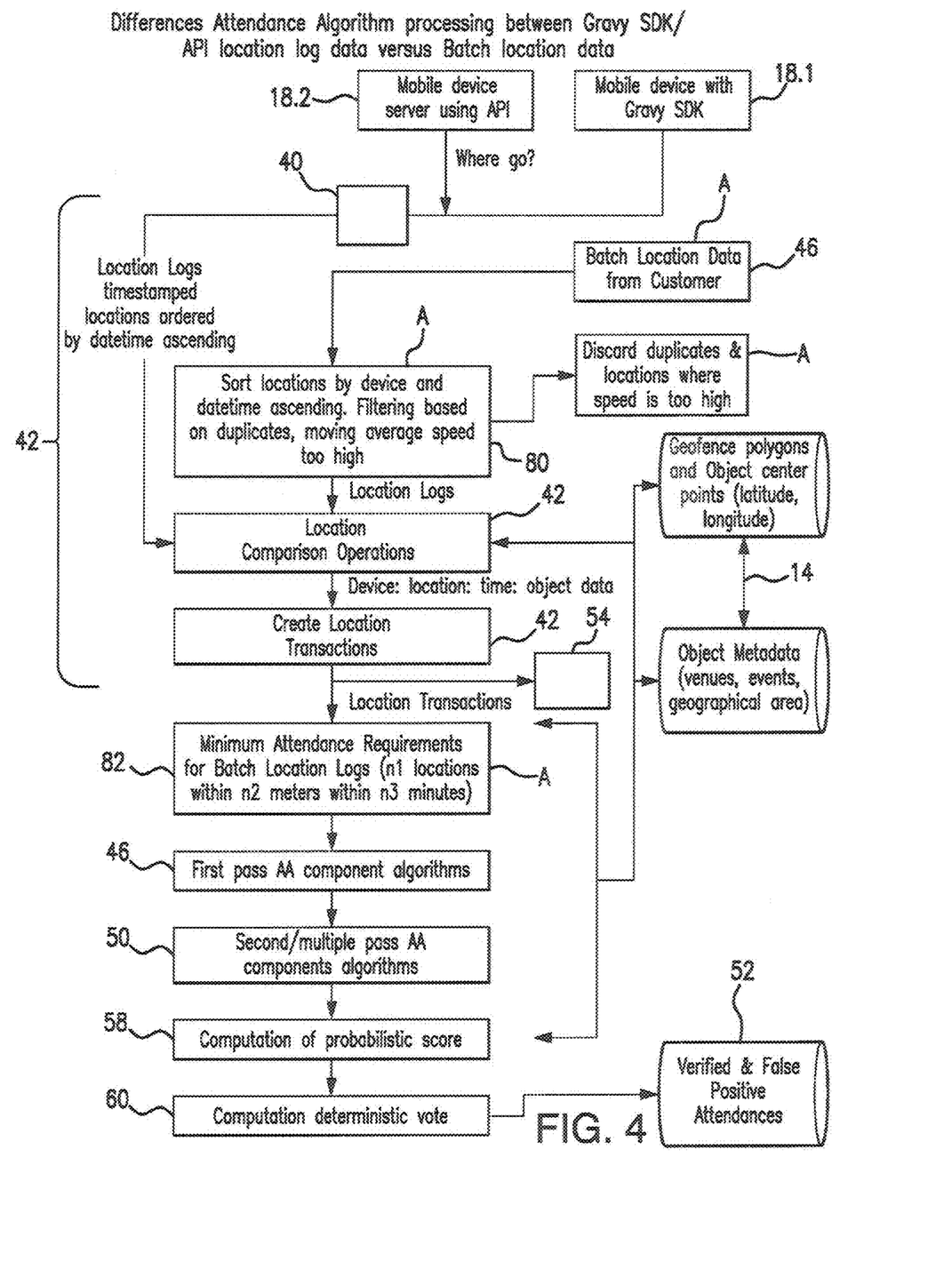
FIG. 4 shows more detailed processing steps for enhanced location attendance.

The grouping and filtering of locations into candidate attendances helps with the calculation of exit for attendances when batch location data is processed. This occurs because batch location data may not be continuously collected and state change (e.g. driving->walking->at rest->walking->at rest) may not be considered by the mobile application collecting the locations. Without this, calculation of an exit for an attendance might appear to make the device be instantaneously many miles away. While this would be classified as a false attendance, the attendance, though false, represents incorrect data. Computations in the probability function 58 along with a deterministic evaluation 60 using the above information results in a determination of the chances of a negative (fake) or positive attendance of a device at an event or function at a location. The result is stored in memory 52.

The diagram of FIG. 4 illustrates the differences between the platform available SDK/API Location Logs and Batch Locations which are pre-processed and additionally filtered to create the location logs, stored in memory 14. It also illustrates where initial candidate attendances are created as part of the Attendance Algorithm. Processes specific to Batch Locations are in steps labeled A.

Location Transactions

Once the location data is received from the SDK device 18 or from a batch location file 46, the Platform uses this data and the proximity area definitions in memory 14 to determine whether a device location is within the area of a proximity area. When the locations are within the proximity area of one or more objects, this data is recorded as location transaction records or in short hand terms: location transactions in memory 54.

The location transaction records 54 are used by the Attendance Algorithm to understand the device location: time:object or place of interest (l:t:o) proximity area intersections. The intersections are augmented with metadata from memory 14 about the object involved. These intersections and the metadata represent the data from which attendance can be calculated in the steps below and the source data from which true and false attendance can be determined. This data forms the location transaction records 52.

In the underlying system 12, the location transaction data does not itself indicate attendance at a place (venue, geographical area) or event, but are recorded as indicators that the probability of attendance should be evaluated. As illustrated in the overview diagram above, no other product feature such as user segmentation, analytics or predictive services uses the location transaction data. They work solely off of the attendance data created by the Attendance Algorithm.

Figure 5:
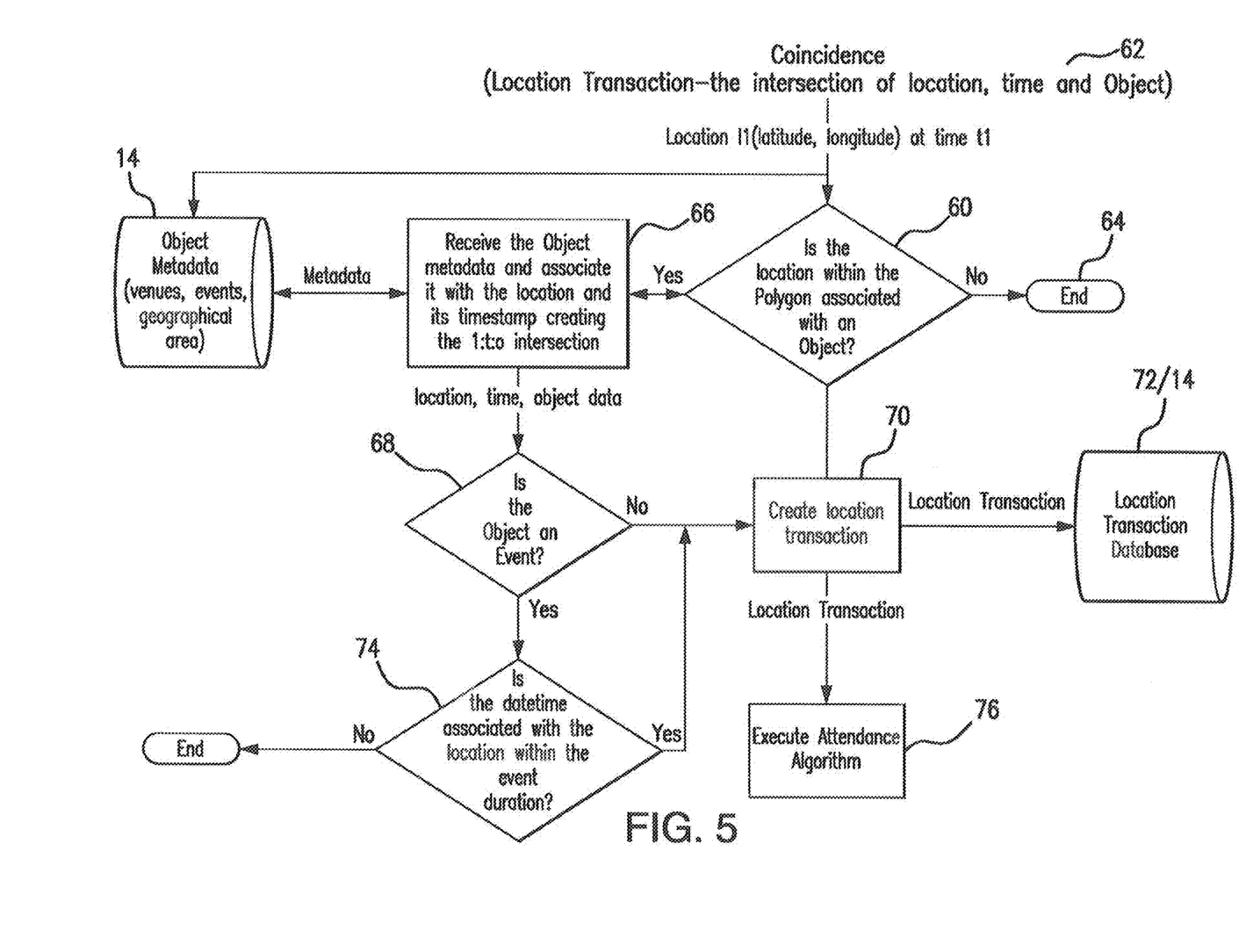
FIG. 5 shows details of the enhanced attendance determination.

FIG. 5 illustrates how device appearances at places and times for something of interest in the nature of an event or service or function (coincidence of device being at location transactions) are created from time stamped locations. While the diagram shows the processing of a single such coincidence, a set of time contiguous coincidences for locations, also termed a location log, are normally processed together for Attendance verification purposes. The underlying platform also supports real time processing of device appearances at locations.

In the diagram of FIG. 5, a coincidence 62 is compared in function 60 to database 14 of object polygons to determine if the latitude and longitude (geocode) is within one or more Object polygons. If the location is not within any Object polygons, then processing stops in step 64. If the location is within at least one polygon, processing continues and the metadata of the Object(s) associated with the polygon(s) retrieved from the previous step are returned in step 66. Object metadata includes the object type (event, venue or geographical area), object name, object description, object category, hours of operation, min and max dwell times and may include other data such as seating capacity and area (square meters). This metadata is applicable through out the data base 14.

In step 68, a determination is made if the object is or is not an event, if it is not then the location transaction record is created in step 70 and stored in database 72 associated with the general database 14. The location transaction record is also sent to the Attendance Algorithm records 76 also a part of database 14 via function 70 where it persists. If the Object is an event, then, in step 74, the date and time (from the time stamp coincidence) is compared to the duration of the event where the duration of the event is defined using the event start time and event end time along with a small percentage of additional time (buffer time, defined in minutes) before the start time of the event and after the end time of the event to catch the full duration of devices within the polygon shortly before and shortly after the event. The attendance algorithm takes this buffer space for an event into consideration to ensure that locations recorded within the buffer period do not themselves reflect cases which would create false positives. To meet the minimum requirements of the attendance algorithm, 1 or more locations must be detected within the event start and end times and the min and max dwell times for the event object must still be met.

If the location is not within the event duration the location is not considered. If the location is within the event duration, then a location transaction record is created in function 74, persisted and sent to the attendance algorithm records database 76.

Attendance Algorithm Details

General Processing Structure

The Attendance Algorithm function 76 executes two major subroutines. The first pass subroutine creates initial candidate attendances and then performs both deterministic and probabilistic determination of true versus false attendance. The second pass subroutine actually makes multiple passes through the attendances and related location transactions in order to perform more complex transformations of the incoming locations into verified attendances. At the end of the processing, the attendance records are persisted, as that term is know in the art for long term database recordation, for the device into a database and/or file storage.

The batch location file mode of the Gravy Platform adds an additional step prior to the first pass routine. This step creates candidate attendances before passing them into the first pass subroutine. In this mode the first pass subroutine does not create the initial candidate attendances, but does perform the rest of the processing performed by the first pass subroutine.

Calculation of Exit in Various Modes

Calculation of exit of an attendance is performed differently depending on whether the location data is received from a mobile application with SDK Single Location, SDK Batch mode or is received from a batch location file. From an application with the SDK operating in Single Location Mode, the Platform computes exits by storing previous locations which are within a proximity area and comparing each new location against these proximity areas. If the new location is no longer within one of the saved proximity areas, an exit is recorded for the device for that proximity area.

In SDK Batch mode a different mechanism is used. The algorithm to determine exit is performed on a set of location transactions ordered by time. If a device location places it within a proximity boundary for a specific object at a specific time and location is received at a different second time which is no longer within the proximity boundary, an exit is recorded for that object at the second time.

The Batch File Location mode using files 46 of the platform differs in that the algorithm 80 and 82 of FIG. 4 to compute candidate attendance is executed first. The candidate attendances are ordered by time before submission to the rest of the Attendance Algorithm below in the figure. Locations not within a candidate attendance are not considered by the attendance algorithm and will not be used to create attendances. The algorithm for creation of candidate attendances for Batch locations was outlined in a previous. The last location which meets the candidate attendance requirements is used to determine the exit and set the attendance duration.

Attendance Algorithm—Single Location and Batch Modes

The Attendance Algorithm first pass subroutines 46 perform a number of functions including:

SDK: Computation of exit—determine when a device was within the proximity area and then has left the proximity area—this is a critical step which supports additional calculation by defining the initial candidate attendance end datetime for the SDK. Initial candidate attendances from batch location file mode already have end datetimes, however this step is performed and may adjust the end date time of the candidate attendance Batch Locations: Calculation of initial candidate attendances and their duration aka dwell time. The candidate attendances may be changed by later steps within the algorithm and in these cases the attendance duration may change. For example, downstream routines may collapse or divide attendances. As mentioned above, the batch file mode contains an earlier step which creates initial candidate attendances, this step is still executed to determine the attendance duration Initial comparison of attendance duration versus minimum and maximum dwell times for the object (venue, geographical area or event). The comparison leads to a component vote for true or false attendance Initial comparison of start and end times of the attendance duration versus hours of operation for the object. The comparison leads to a component vote for true or false attendance Computation of device speed when indicated (e.g. older versions of the SDK deployed, batch location file mode) and comparison to the system parameter value which indicates the speeds at which attendance is unlikely. The comparison leads to a component vote for true or false attendance Consideration of associated point location check in(s). If a point location associated with the object is attended by check in, then a vote for true attendance is forwarded. There is no vote for false attendance for this component.

Initial computation of the deterministic vote for true or false attendance based on the component votes Calculation of the probability based score components based on (a) number of location transactions associated with the attendance, (b) accuracy of the locations provided for the device when accuracy is available, (c) ratio of the location accuracy to the radius/average radius of the polygon, (d) ratio of the area of the location/attendance shape intersection with proximity area shape to the location/attendance area Determining Average Radius as Needed The length from the center point of a polygon such as one orming a geofence is informally called the radius or half diameter for the purpose of this disclosure. When considering location inaccuracy, consider a device location with up to 100 meter accuracy. If the device is located at the center point of a square polygon with a diameter of 210 meters and half diameter or radius of 105 meters, then the probability is very high that the device location will still be reported within the polygon because the distance to any edge of the polygon is greater than the inaccuracy of the location reported. If the device is located 50 meters from the center in any direction, then the probability is still high that the device location will be reported inside the polygon, since the distance to some of the sides is still longer than the inaccuracy of the device location.

As described elsewhere, it is straightforward to observe that when the distance from the center to the edges/vertices of a polygon is larger than the location inaccuracy the probability that the device is within the proximity are high. Conversely when the distance to the side/vertices is significantly less than the location inaccuracy, than the probability that the device is within the proximity boundary decreases.

Calculating the radius or half diameter of an irregular polygon is not defined. When the polygon is irregular, a reasonable means of calculating a simulation of the radius is required. Calculated in the radius of an incircle on the irregular polygon is not itself very accurate. Since a high percentage of irregular polygon's in use by Gravy have four sides, an estimate using at the length from the estimate center to N sides, where N is >=4, divided by N is a workable estimate for the average radius.

Figure 6:
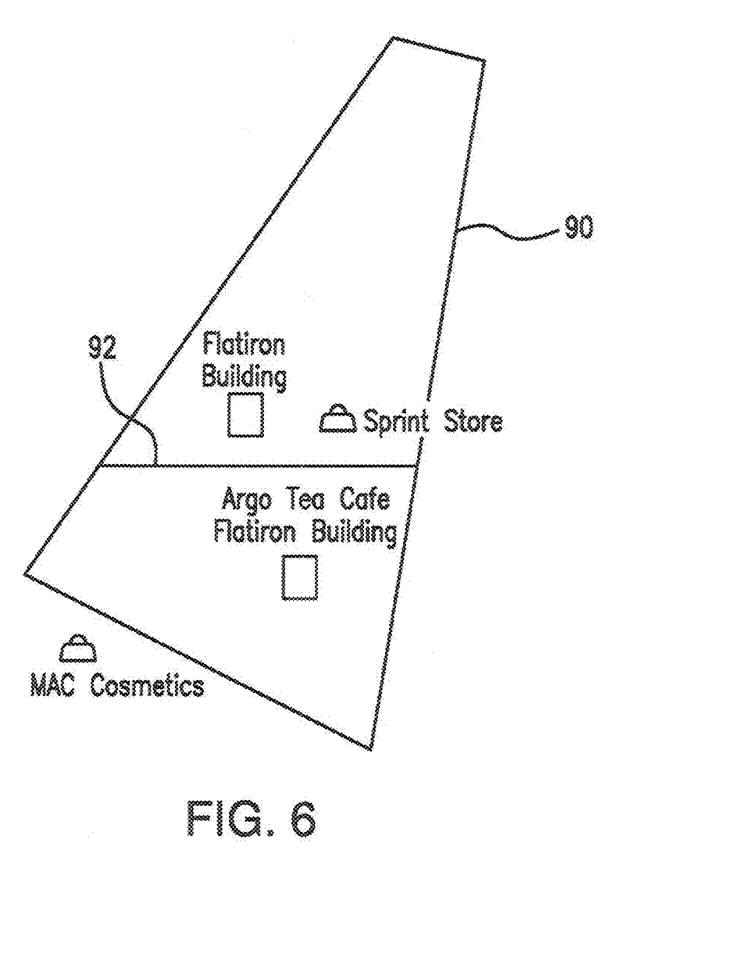
FIG. 6 show polygon boundary geometry details for analysis in the invention.

FIG. 6 shows an example of an irregular shaped polygon 90. It illustrates how the radius of an irregular shaped polygon yields half diagonals 92 (from center to side) of significantly different lengths based on the direction of measurement. The distance from the center point to an edge is significantly smaller drawing a horizontal line to a side than a vertical line from the center point to a line.

At the end of the first pass, the following data is generated by the algorithm:

Attendance duration for the candidate attendance along with attendance start and end times, where end time is based on the determination of exit Overlap of attendance duration versus the open hours for the object The Attendance Algorithm second/multiple pass subroutines 60 perform the following logic for the set of attendances output from the first pass subroutine:

Multiple attendance on same proximity boundary within a specific time period analysis & attendance modification Multiple simultaneous attendance analysis and modification A deterministic vote of true positive or false positive attendance A score for the attendance based on score provided by components which compute the probability of attendance based on different To be noted, the second/multiple pass portion of the algorithm may or may not modify the attendances already calculated. Modification only occurs if one of the special cases is detected and further meets the criteria required to modify the first pass attendance. Background information on the second/multiple pass cases were presented above. Further details on the algorithms for these scenarios are presented below.

Multiple Attendances by Same Device on Same Object when Close Together in Time

For multiple attendances on the same proximity period within a specified time period, the algorithm 50 determines whether two or more of the attendances in that time period should be collapsed into a single attendance. The algorithm determines whether to collapse 2 or more attendances by looking at the minimum and maximum location accuracies reported, the elapsed time between the prior attendance end date time and the next attendance start date time, whether the subsequent attendance occurred after the object close time, the object type and metadata about the underlying object.

In general the noted times for attendances separated (end to start time) for longer than a predetermined system parameter specified value are not collapsed. As an example, the parameter value may be set to two hours. Following this example, if the first attendance in the set being considered ends 3 hours before the start of the next attendance for the same device at the same object, then the attendances would not be collapsed into a single attendance.

Also, any attendance whose attend duration completely occurs outside of the event time or by a specified percentage outside of open hours for a venue or geographical area is not collapsed into an attendance. In certain situations, attendances (by the same device, at the same object, within the system parameter time) whose duration lies partially outside of the open hours for a venue or geographical area is considered for collapsing. For event object types, attendance is only counted once, so multiple attendances within the event's start and end time are collapsed into a single attendance.

When two or more attendances on the same object by the same device are collapsed, the start time of the new attendance is set as the earliest start time of the set of attendances being collapsed and the end time is set to the end time of the latest attendance in the set. The attendance duration is recomputed based on the start and end time of the new attendance and all metadata and relevant calculated data are recomputed and/or copied into the new attendance. The set of collapsed attendances are removed, but may be logged for further analysis.

The deterministic vote on true or false positive is recomputed for the collapsed attendance and the probabilistic definition of attendance via score is also recomputed.

Multiple Simultaneous Attendance Analysis and Attendance Modification

The attendance algorithm sorts through sets of location transactions for a device and looks for those that occurred simultaneously—same device, same object, same input location. For each object in this set, the subroutine looks for other locations for the device which are close from a time perspective—both before and after the location transactions in the set. The sub routine then employs a sub algorithm which performs the following:

Analyzes the augmented set of location transactions for the device and objects in the set and related attendances (both true and false positive)

The analysis looks at patterns of movement in and out of the object proximity boundaries. This analysis is used to determine whether the device is moving in and out of the overlapping objects or whether the attendances are caused solely by the overlapping proximity areas. This information is used to determine which attendances to keep and/or which attendances to redefine Another subroutine handles the redefinition of attendance. It uses pattern analysis to determine the path of the device over time in and out of the set of objects. It first determines which object the device is in first and then its transition to other objects. Once the subroutine has looped through all location transactions in the set and determined the device—object transitions, the new attendances are defined, calculated data is updated for these attendances and metadata about the objects is copied. The prior attendances associated with the location transactions are removed.

When new attendances are computed, their start and end datetimes are determined and the attendance duration is calculated. The deterministic vote for true or false attendance is recomputed and the probability based score is recalculated.

Persistence of Results to Third Party Databases

Once the first pass and second pass (multi-pass) subroutines 46 and 50 are complete, the attendance records are persisted. The last step is performed by the attendance algorithm. The software that implements the attendance algorithm allows it to be persisted to databases such as MySQL and Amazon Redshift, or to a file system. The software that performs the persistence of attendance records is designed to be flexible as the to the target database or file system.

When the attendance records are persisted, both true and false positives are persisted. Data persisted per attendance includes computed values, object metadata, deterministic vote of true or false positive and the probabilistic vote based on score.

In addition, a suspicious attendance log is written. The Attendance Algorithm flags both false and true attendances which exceed certain value ranges so that they can be further studied or used for data mining rules from this data. An example is a set of attendances from the first pass of the algorithm that occur simultaneously or which overlap for the same device, where the number of simultaneous/overlapping attendances exceeds a system parameter.

Metadata and Computation of the Deterministic Vote on Attendance

Figure 7:
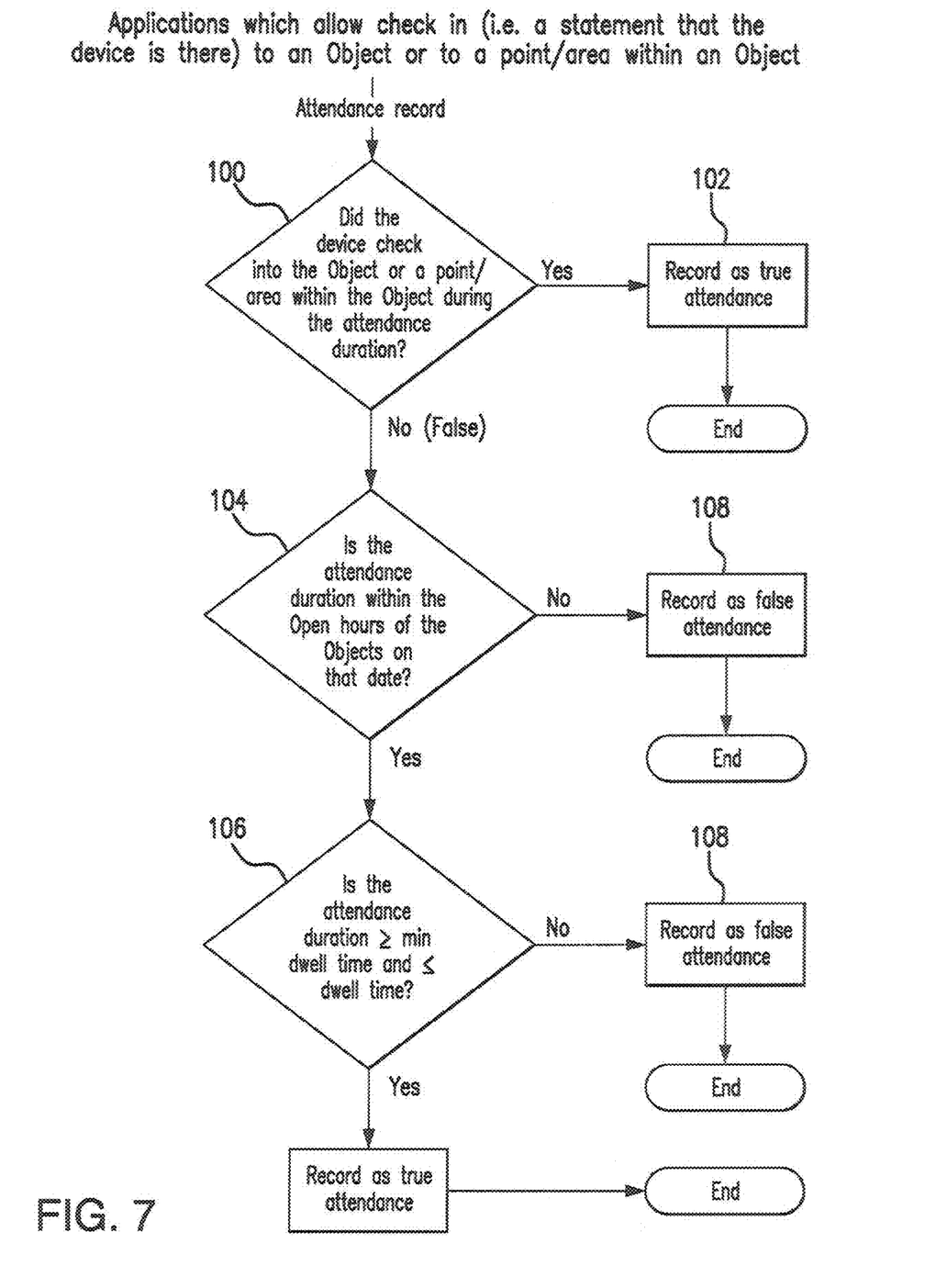
FIG. 7 show device check in functions.

The FIG. 7 illustrates the computation of the deterministic vote on attendance.

Use of Hours of Operation and the Calculation of the Deterministic Vote

The start and end time of the attendance are determined and compared to the hours of operation associated with the object. If the attendance occurs completely outside of the hours of operation for the attendance, the subroutine 100 of FIG. 7 will support a vote for false attendance for the deterministic vote. If the attendance occurred completely within the hours of operation for the object in question, this subroutine will forward a vote for true attendance to function 100 for recording. When the attendance partially overlaps the hours of operation for the object, several factors are considered, including the percentage of overlap of the attendance duration on the object hours of operation. If the percent overlap is greater than or equal to Y, a value set by system parameter (e.g. 85%), then this subroutine will forward a vote for true attendance. If the comparison yields a value less than Y, then this component forwards a false attendance vote. The same metadata and calculation are used in the batch file location attendance algorithm of FIG. 4 for this portion of the deterministic vote.

Use of Min and Max Dwell Times and the Calculation of the Deterministic Vote

The min and max dwell times of the object are used in comparison to the Attendance duration (aka dwell time) as input to the deterministic vote for true or false positive. When the attendance duration is less than the minimum dwell time or greater than the maximum dwell time, this components input to the deterministic vote is for false attendance. Attendance duration values within the min and max dwell time values creates input to the deterministic vote for true attendance from this component. The same metadata and calculation are used in the batch file location attendance algorithm for this portion of the deterministic vote.

Calculations and Metadata Related to the Probability of Attendance—the Probabilistic Score The attendance algorithm provides a score based on calculations of the probability of attendance. The score can be used as is or can be turned into a probability of attendance. Each component of the probabilistic score has a min and max score which can be awarded if conditions are met. Some components support intermediate score values (i.e. between the min and max points) to be awarded. The maximum number of points which can be awarded from all components is available and can be used to create a factor from the points awarded based on probability determinations.

Number of Location Transactions Recorded During the Attendance

The attendance algorithm assigns points when the number of non-exit locations associated with the attendance is greater than 1. This subroutine considers whether or not the data is from the SDK or from a batch file of locations. The SDK looks at the state transitions and velocity when deciding to include locations rather than logging locations every n seconds. Higher numbers of location transactions are assigned higher points up to the limit if the location data is from the SDK. For batch file location processing, the attendance algorithm assigns only a min and max score based on the number of location transactions associated with the attendance as the logic for determining when to persist locations is unknown.

High Accuracy Locations

The functions in the processing of the invention in FIG. 7 looks at the number of locations associated with the attendance which had high accuracy. High accuracy is generally considered <=20 meters, but typical GPS based high accuracy is typically in the 2-5 meter range.

If there is at least one non-exit determining high accuracy location associated with the attendance a minimum score is assigned. If there are no non-exit high accuracy locations associated with the attendance then no points are assigned. If there is more than one high accuracy location associated with the attendance and all locations are of high accuracy then the maximum score is assigned.

If no accuracy data is available for the locations associated with the attendance then no points are assigned from this component.

Ratio of Location Accuracy to Radius/Estimated Radius Ratio

The location accuracy to proximity area radius or average radius ratio is determined and used in the calculation of the probability of attendance. radr=la/par, where radr is the ratio of location accuracy to radius ratio, la is the location accuracy and par is the proximity area radius or average proximity area radius. Lower ratios receive higher numbers of points. For example, a location accuracy of 20 meters, where the radius of the polygon is 50 meters creates a radr of 0.4 which would be assigned more points than a location accuracy of 100 meters and a proximity area radius of 50 meters with radr=2.

The radr can be used when there is a single location associated with the attendance.

Ratio of the Area of the Location/Attendance Shape Intersection with Proximity Area Shape to the Location/Attendance Area This computation is only made when there are at least 3 locations associated with the attendance during the duration (i.e. between the start and end timestamps of the attendance), not including any location which was used to calculate exit. If there are less than 3 locations which meet the requirement, this calculation is not performed.

The ratio of area location/attendance shape intersection with proximity area shape to the location/attendance area is used in the calculation of the probability of attendance when requirements are met for its calculation.

$$roalaa=laao/laa$$

where roalaa is the ratio of the area of location/attendance shape overlap with the proximity area shape divided by the location/attendance area, laao is the area of the location area/attendance area overlap with the proximity area and the laa is the area of the location points associated with the attendance.

To compute the laao, the laa shape is first computed and then the intersection with the pa shape is determined. The laa shape is formed from the locations within and without the proximity area during the attendance duration not including any locations used to calculate exit. Straight lines between the locations are used to create a shape with an enclosed area. Solutions which do not create an enclosed area are rejected. The intersection of the laa to the pa shape overlap is determined by a geospatial intersection operation. The shape of the proximity area is available from the proximity area data. Once both shapes are available, the intersection of the two shapes is determined and the area of the intersection computed. The higher the ratio, the higher the higher the probability of attendance and the higher the number of points assigned from this operation.

For example, if the laa is 50 square meters, and the area of the intersection of the two shapes is 40 square meters, then the roalaa is 40 square meters divided by 50 square meters=0.8. If the area of intersection between the two shapes is 20 meters, then the ratio is 20 square meters/50 square meters or 0.4. In terms of this calculation, 0.8 denotes a higher probability of attendance than 0.4 and therefore a higher number of points will be assigned to a ratio of 0.8 than 0.4.

Notes on the Use of the Deterministic Vote and Probability Based Score

Business users of device attendance data from memory 14 they are given access to have access to and the option to determine whether or not to count attendances deemed false as true attendances. For example, the user may decide to include attendances marked false which have high scores based on the probability of attendance.

Conversely such users of device attendance data may decide to declare attendances output as true positives as false positives if the probability derived score is lower than one or more thresholds they have set for true attendance.

The platform reviews false attendances with high scores. This review helps fine tune the input parameters and the Attendance Algorithm itself.

Batch File Attendance Algorithm

The Batch File Attendance Algorithm functions of FIG. 4 et seq. incorporates the same use of metadata, the use of deterministic votes for true versus false attendance, the same scoring based on probabilistic factors, and the same persistence mechanisms and options. However, it does perform unique operations and calculations because the data provided via the batch file may not be as rich as the data provided via the SDK. For example, information about the location data provided may be more limited or less well known and the locations provided may be sparser than what the Gravy SDK would normally provide.

An example of limited data in this mode is that the location data provided may not include accuracy. In terms of data being limited/less well known, data may not be continuously provided over a 24-48 hour period and the Attendance Algorithm does not know whether every location obtained by the application was recorded and the conditions under which the data provided in the data file was collected.

Location sparseness can be caused by different factors. For example, the originating device application may only retrieve and report location data when the app is in the foreground or when the app is in the foreground and right before an ad is served to the application.

Retrieving Ordered Sets of Device Data

The platform does not require that location data supplied in batch via files be grouped by device and ordered by timestamp descending (e.g. earliest timestamp first for the device, followed by next earliest, etc.) It also does not require that all the data for a specific device be contained in the same file. Instead the platform retrieves data across all submitted files, groups location records by device and provides the data in timestamp descending order to the Attendance Algorithm.

Determination of Candidate Attendance

Because the SDK is not providing the data and, based on the factors listed above, the Attendance Algorithm determines initial candidate attendances via a different mechanism. After determining device locations within object proximity areas, the Attendance Algorithm next determines initial candidate Attendance by determining the set of location records associated with an object via proximity area and applying the following filter:

Group and return the set of location transactions for an object where there are at least N transaction within X meters of each other, where N and X are defined as system parameters Create candidate Attendances from the set of records returned from the above filter The filter removes locations from initial consideration where there are too few locations and the locations are too far apart to represent likely attendances.

The candidate attendances which are created by this step are fed into the first pass routine of the Attendance Algorithm. When passed from this mode, the first pass routine does not create the initial candidate attendances but the routine does perform the rest of its calculations.

Metadata and Standard Calculations

Object metadata and the calculations used for scoring probability of attendance are the same for batch file location processing as for the SDK. If there are special provisions made for batch file location processing, these have been called out in previous sections during the discussion of deterministic votes for true/false device attendance and probability based scoring of device attendance.

The invention claimed is:

1. A method for determining attendance based on location data, comprising:

receiving, at a processor, a plurality of data triplets generated by a mobile device, each data triplet including a device identifier, a location of the device obtained from a positioning mechanism associated with the device, and a time at which the location was determined;

analyzing, by the processor, the plurality of data triplets to determine a time period during which the mobile device was in consistent proximity to a place of interest;

determining, by the processor, an accuracy of the location of the device based on whether the device is moving at the time when the location is determined and based on whether high accuracy location is reported within a set of locations reported for the device within the time period;

analyzing, by the processor, the plurality of data triplets and at least the accuracy of the location of the mobile device to determine that a user associated with the mobile device was in attendance at the place of interest during the time period;

recording, by the processor, the attendance in a memory in communication with the processor; and sending a control signal from the processor to an advertising system associated with the place of interest when the user trips a boundary of the place of interest, the control signal configured to alert the advertising system of the user's attendance.

2. The method of claim 1, wherein the analyzing to determine the time period during which the mobile device was in consistent proximity to the place of interest includes:

determining a geofence; and identifying a set of locations of the plurality of data triplets within the geofence.

3. The method of claim 2, wherein the identifying of the set of locations includes selecting a subset of the plurality of data triplets with locations within the geofence that appear consecutively in time.

4. The method of claim 2, wherein the identifying of the set of locations includes:

selecting a subset of the plurality of data triplets with locations within the geofence that appear consecutively in time except for at least one data triplet with a location outside the geofence; and discarding the at least one data triplet with the location outside the geofence.

5. The method of claim 1, wherein the analyzing to determine that the user associated with the mobile device was in attendance at the place of interest during the time period includes:

determining a geofence; and determining a time at which the mobile device exited the geofence.

6. The method of claim 1, wherein the analyzing to determine that the user associated with the mobile device was in attendance at the place of interest during the time period includes:

determining a geofence; and
selecting a subset of the plurality of data triplets with locations within the geofence that appear consecutively in time.

7. The method of claim 1, wherein the analyzing to determine that the user associated with the mobile device was in attendance at the place of interest during the time period includes:
determining a geofence;
selecting a subset of the plurality of data triplets with locations within the geofence that appear consecutively in time except for at least one data triplet with a location outside the geofence; and
discarding the at least one data triplet with the location outside the geofence.

8. The method of claim 1, wherein the analyzing to determine that the user associated with the mobile device was in attendance at the place of interest during the time period includes:
determining a time range for an event associated with the place of interest; and
determining that the mobile device was in consistent proximity to the place of interest for a time period corresponding to the event.

9. The method of claim 1, wherein the analyzing to determine that the user associated with the mobile device was in attendance at the place of interest during the time period includes:
determining a valid dwell time range for the place of interest; and
determining that the mobile device was in consistent proximity to the place of interest for a time period within the valid dwell time range.

10. The method of claim 1, wherein the analyzing to determine that the user associated with the mobile device was in attendance at the place of interest during the time period includes:
determining a speed at which the mobile device moved during the time period during which the mobile device was in consistent proximity to the place of interest; and
determining that the speed is below a maximum speed indicative of attendance at the place of interest.

11. The method of claim 1, wherein the analyzing to determine that the user associated with the mobile device was in attendance at the place of interest during the time period includes calculating a probability score based on a total number the plurality of data triplets including times within the time period, an accuracy for each of the locations of the device, a ratio of the accuracy to an area of the place of interest, a shape of the place of interest, or a combination thereof.

12. The method of claim 1, wherein the analyzing to determine that the user associated with the mobile device was in attendance at the place of interest during the time period includes calculating a deterministic score based on a total number of the plurality of data triplets including times within the time period compared to place of interest metadata including hours of operation and category metadata including minimum and maximum dwell time.

13. The method of claim 1, wherein the analyzing to determine that the user associated with the mobile device was in attendance at the place of interest during the time period includes determining that the attendance of the user associated with the mobile device was caused by the location of the user's home in respect to the location of the place of interest or the location of the user's work place in respect to the location of the place of interest.

14. A system for determining attendance based on location data, comprising:
a transceiver;
a memory; and
a processor in communication with the transceiver and the memory and configured to:
receive, by the transceiver, a plurality of data triplets generated by a mobile device, each data triplet including a device identifier, a location of the device obtained from a positioning mechanism associated with the device, and a time at which the location was determined;
analyze the plurality of data triplets to determine a time period during which the mobile device was in consistent proximity to a place of interest;
determine an accuracy of the location of the device based on whether the device is moving at the time when the location is determined and based on whether high accuracy location is reported within a set of locations reported for the device within the time period;
analyze the plurality of data triplets and at least the accuracy of the location of the mobile device to determine that a user associated with the mobile device was in attendance at the place of interest during the time period;
record the attendance in the memory; and
send a control signal from the processor to an advertising system associated with the place of interest when the user trips a boundary of the place of interest, the control signal configured to alert the advertising system of the user's attendance.

15. The system of claim 14, wherein the processor is configured to determine the time period during which the mobile device was in consistent proximity to the place of interest by:
determining a geofence; and
identifying a set of locations of the plurality of data triplets within the geofence.

16. The system of claim 15, wherein the identifying of the set of locations includes selecting a subset of the plurality of data triplets with locations within the geofence that appear consecutively in time.

17. The system of claim 15, wherein the identifying of the set of locations includes:
selecting a subset of the plurality of data triplets with locations within the geofence that appear consecutively in time except for at least one data triplet with a location outside the geofence; and
discarding the at least one data triplet with the location outside the geofence.

18. The system of claim 14, wherein the processor is configured to determine that the user associated with the mobile device was in attendance at the place of interest during the time period by:
determining a geofence; and
determining a time at which the mobile device exited the geofence.

19. The system of claim 14, wherein the processor is configured to determine that the user associated with the mobile device was in attendance at the place of interest during the time period by:
determining a geofence; and
selecting a subset of the plurality of data triplets with locations within the geofence that appear consecutively in time.

20. The system of claim 14, wherein the processor is configured to determine that the user associated with the mobile device was in attendance at the place of interest during the time period by:
  determining a geofence;
  selecting a subset of the plurality of data triplets with locations within the geofence that appear consecutively in time except for at least one data triplet with a location outside the geofence; and
  discarding the at least one data triplet with the location outside the geofence.

21. The system of claim 14, wherein the processor is configured to determine that the user associated with the mobile device was in attendance at the place of interest during the time period by:
  determining a time range for an event associated with the place of interest; and
  determining that the mobile device was in consistent proximity to the place of interest for a time period corresponding to the event.

22. The system of claim 14, wherein the processor is configured to determine that the user associated with the mobile device was in attendance at the place of interest during the time period by:
  determining a valid dwell time range for the place of interest; and
  determining that the mobile device was in consistent proximity to the place of interest for a time period within the valid dwell time range.

23. The system of claim 14, wherein the processor is configured to determine that the user associated with the mobile device was in attendance at the place of interest during the time period by:
  determining a speed at which the mobile device moved during the time period during which the mobile device was in consistent proximity to the place of interest; and
  determining that the speed is below a maximum speed indicative of attendance at the place of interest.

24. The system of claim 14, wherein the processor is configured to determine that the user associated with the mobile device was in attendance at the place of interest during the time period by calculating a probability score based on a total number the plurality of data triplets including times within the time period, an accuracy for each of the locations of the device, a ratio of the accuracy to an area of the place of interest, a shape of the place of interest, or a combination thereof.

25. The system of claim 14, wherein the processor is configured to determine that the user associated with the mobile device was in attendance at the place of interest during the time period by calculating a deterministic score based on a total number of the plurality of data triplets including times within the time period compared to place of interest metadata including hours of operation and category metadata including minimum and maximum dwell time.

26. The system of claim 14, wherein the processor is configured to determine that the user associated with the mobile device was in attendance at the place of interest during the time period by determining that the attendance of the user associated with the mobile device was caused by the location of the user's home in respect to the location of the place of interest or the location of the user's work place in respect to the location of the place of interest.

27. The method of claim 1, wherein the positioning mechanism is a global positioning system (GPS).

28. The system of claim 14, wherein the positioning mechanism is a global positioning system (GPS).

* * * * *